Figure 1:
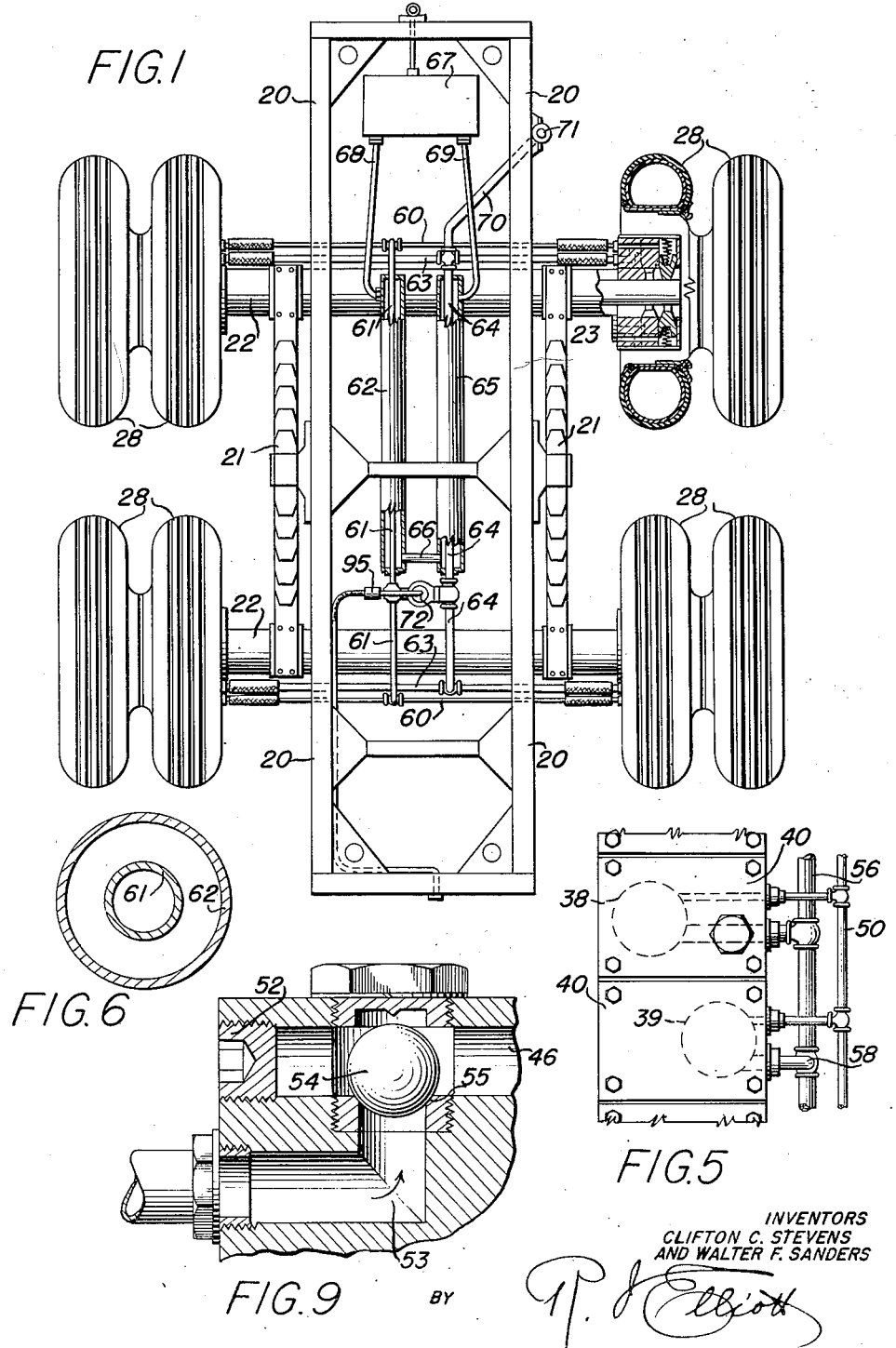

April 17, 1951
C. C. STEVENS ET AL
2,548,919
HYDRAULIC BRAKE
Filed Feb. 24, 1947
3 Sheets-Sheet 2
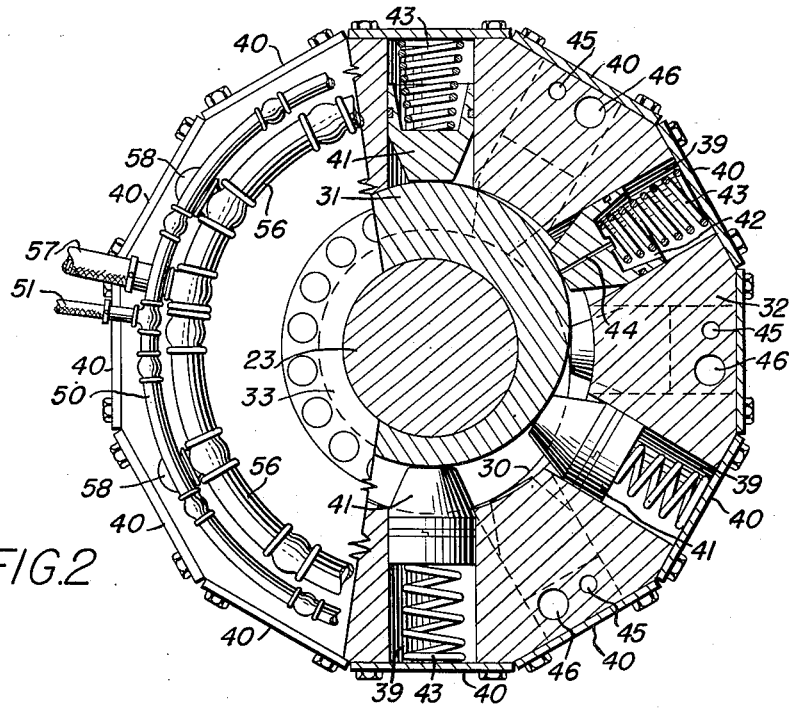
FIG.2
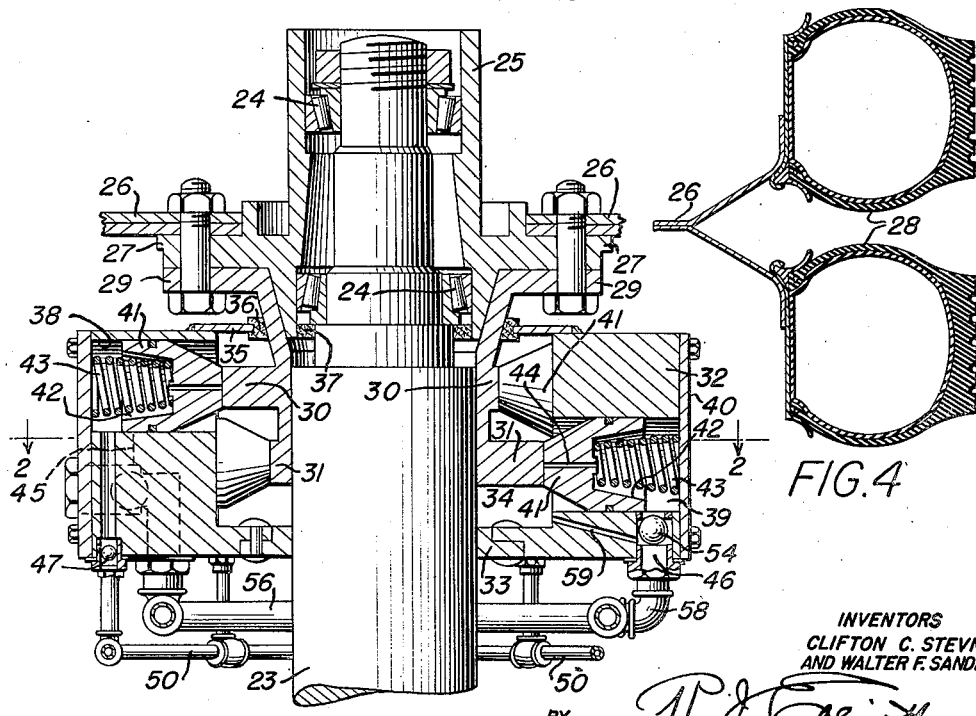
FIG.3
FIG.4
INVENTORS
CLIFTON C. STEVNS
AND WALTER F. SANDERS
BY
ATTORNEY April 17, 1951 C. C. STEVENS ET AL 2,548,919
HYDRAULIC BRAKE
Filed Feb. 24, 1947 3 Sheets-Sheet 3
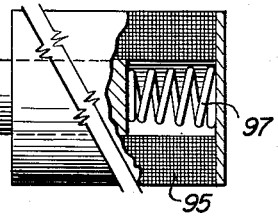
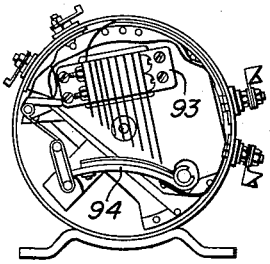
FIG.8
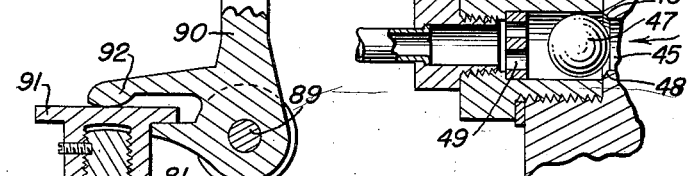
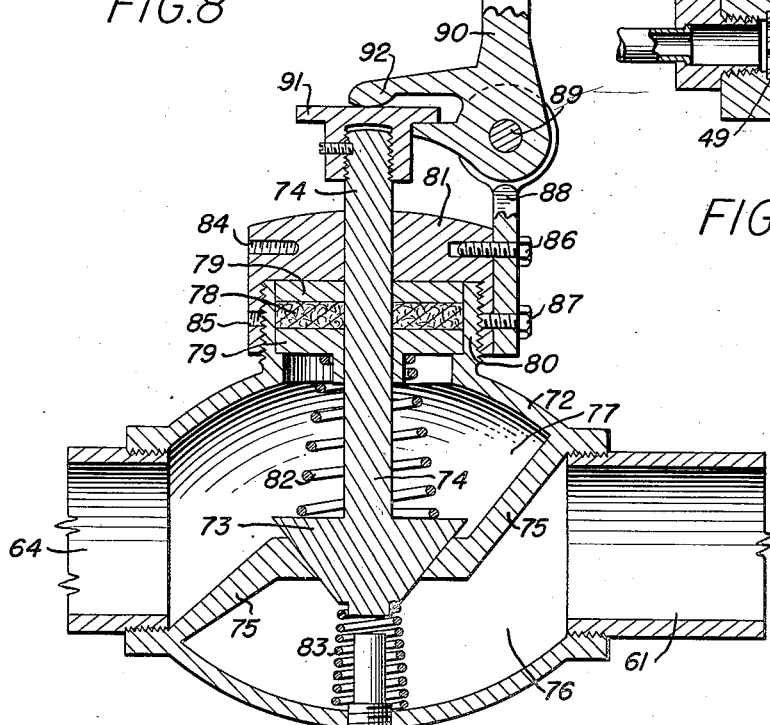
FIG.10
FIG.7
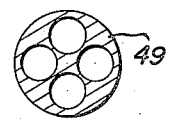
FIG.11
INVENTORS
CLIFTON C. STEVENS
AND WALTER F. SANDERS
BY
ATTORNEY Patented Apr. 17, 1951

2,548,919

UNITED STATES PATENT OFFICE 2,548,919

HYDRAULIC BRAKE

Clifton C. Stevens, Wells, Maine, and Walter F. Sanders, Tacoma, Wash., assignors to Mountain Brake and Engineering Corporation, Tacoma, Wash., a corporation of Washington Application February 24, 1947, Serial No. 730,244

1 Claim. (Cl. 188—91)

This invention relates to brakes for machinery, especially to brakes for vehicles having great weight and momentum, such as trucks and their trailers, airplanes, railroad cars, busses and other similar vehicles, as well as to brakes for the hoisting drums of power shovels, cranes and similar machinery.

The objects of our invention are, first, to provide a powerful braking action on the wheels of the vehicle or machinery without exerting strong physical effort; second, to provide equal braking action on all the wheels of the vehicle; third, to exert such braking action with but a single control; fourth, to provide automatic lubrication for the moving parts of the brake system; fifth, to provide a wedge action on the lubrication at the contacting surfaces of the mechanism; sixth, to provide a system comprisng a circulating fluid medium; seventh, to provide a means of cooling such fluid medium, whereby the lubrication is helped and a great saving is made in the life of the tires and wheel bearings; eighth, to provide such a brake of great power which occupies approximately the same space as is now occupied by the brake drum of the usual friction brake, thereby eliminating the necessity of increasing the size of the friction brake drum and the width of the truck in order to attain an increased brake action, as is now proposed for heavy vehicles; ninth, to eliminate the heating and burning action of the usual friction brake systems, which result in the frequent necessity of their renewal and repair, and in the deleterious effect on the heavy and expensive tires of such heavy vehicles; tenth, eliminating the compressors or pumps required for air brakes of the usual type; eleventh, to provide a system using very high pressure, thus resulting in compactness and lightness, increased length of life of each brake, decreased cost and descreased cost of upkeep, and reducing the unsprung weight on the axles; twelfth, to provide a brake of increased positive action and decreased slippage; thirteenth, to provide a brake having substantial freedom from drag when not in braking action; and fourteenth, to provide for the automatic braking when the trailer breaks away from connection with the truck.

We attain these and other objects as will readily be perceived by those familiar with the construction and use of such apparatus, by the devices, mechanisms, and arrangements illustrated in the accompanying drawings, in which—

Fig. 1 is a plan view of a trailer chassis equipped with our improved braking apparatus; Fig. 2 is an elevation of the braking mechanism, partly in section, taken on the line 2—2 in Fig. 3; Fig. 3 is a transverse section thereof; Fig. 4 is a section of the tires of the duplex wheel, showing their relation to the mechanism and drawn to a smaller scale; Fig. 5 is a plan view of a portion of the braking mechanism; Fig. 6 is a cross section of the heat exchange; Fig. 7 is a section of the brake control valve; Fig. 8 is a view of the electrical control for the brake control valve when said valve is operated electrically; Fig. 9 is a section showing the check valve in one of the low pressure, or intake passages; Fig. 10 is a similar section showing the check valve in one of the high pressure or outlet passages; and Fig. 11 is an elevation of the stop in such high pressure valve passage.

Similar numerals of reference refer to similar parts throughout the several views.

Although the drawings and description in this application refer particularly to the control of the brakes of a freight trailer, it is to be understood that, with suitable changes in the details, it may be just as readily used on any other vehicle or mechanism and may be controlled by foot control, hand control, mechanically or electrically, or otherwise as may be most convenient or efficient in the particular installatin.

Referring to Fig. 1 of the drawings, the trailer frame 20 is suitably mounted on springs 21, joining the axle housing 22 in the usual manner. The axles 23, in this case, do not rotate and their ends are provided with suitable bearings 24 on which the wheel hubs 25 are mounted and rotate. Each wheel disk 26 is bolted to the hub flange 27, and the tires 28 are mounted thereon as usual.

A braking member 29 is also bolted to the flange 27 and extends inward therefrom. This member 29 surrounds the axle 23 and is provided with an outer eccentric disk 30 and an inner eccentric disk 31. These eccentrics are of equal diameters and eccentricities but are set at opposite phases. The working surfaces of both eccentrics is plated with hard chrome.

A circular cylinder block 32 surrounds the axle 23 and the inner portion of the member 29, with the eccentrics 30 and 31 and is fixed to the non-rotating axle 23 by means of the brake flange 33, which is welded to the said axle.

The space 34 within the block 32 is full of oil or other fluid and is closed on the inner side by the said flange 33; and on the outer side the space 34 is closed by a plate 35, welded to the cylinder block 32, and having an oil seal ring 36 engaging the rotating braking member 29, thus preventing the leaking of the oil from the space 34. A similar oil seal ring 37 is mounted between the hub 25 and the axle 23, adjacent the bearing 24.

Twelve radial cylinders 38 and 39 are made in the cylinder block 32, in two rows, passing from the inner space 34 to the outside. The axes of the cylinders 38 lie in the central plane of the outer eccentric 30 and the axes of the cylinders 39 lie in the central plane of the inner eccentric 31. Separate cover plates or cylinder heads 40 close the outer ends of the cylinders 38 and 39. Pistons 41 are mounted in the several cylinders 38 and 39 and engage the surfaces of the respective eccentrics 30 and 31. These pistons 41 are plated with sponge chrome and freely move in the cylinders, and may rotate therein. Their inner ends are preferably made tapered, with flat ends, and their outer ends are provided with cavities 42. Compression springs 43 lie in the cavities 42 and press against the cylinder heads 40. The oil pressure in the cavities tends to expand the walls thereof to make a closer fit in the cylinders.

Lubrication holes 44 lead through the pistons 41 from the cavities 42 to the surfaces which contact the respective eccentrics, thus making small connections for the oil between the outer side of the pistons and the space 34. Thus, as the eccentric rotates it constantly changes the angle of contact with the truncated end of the piston, forming a changing wedge and forcing the oil into the space 34.

Each cylinder 38 and 39 has a high pressure or outlet passage 45 and a low pressure or intake passage 46 leading therefrom to the inner side of the cylinder block casting 32 said passages entering said cylinders near the outer ends thereof. Each outlet passage 45 leads directly to the check valves 47 (Fig. 10) which is adapted to seat on the surface 48 in the said passage 45 to prevent any back motion of the fluid. The ball 47 is prevented from closing the passage against outward motion of the fluid by means of the perforated stop 49 (Fig. 11). The passages 45 are each connected with the high pressure manifold 50, which in turn is connected by suitable self-sealing tubing 51 with the high pressure tubing system on the vehicle, hereinafter described. The tubing 51 is flexible to permit relative motion between the axle and the body of the vehicle.

Each intake passage 46, of the outer cylinders 38, is blocked by the plugs 52 (Fig. 9) and is offset by the passage 53 in which the ball check valve 54 is seated at 55 to prevent the high pressure from flowing therepast. The passage 53 leads to the intake manifold 56, which is connected by the flexible tubing 57 with the low pressure tubing of the vehicle. The intake passage 46 of the inner cylinders 39 also have a check valve therein, and lead by an outside elbow 58 (Figs. 3, 5) to the manifold 56.

An oil circulating passage 59 leads from the inner space 34 to one of the intake passages 46, thus constantly changing the oil in the space 34.

Referring, now, particularly to Fig. 1, it will be seen that the high pressure flexible tubes 51 are connected together across the vehicle by cross tubes 60 at each axle, and that the two said tubes 60 are connected together by a longitudinal tube 61. This tube 61 is enclosed in a water-jacket tube 62 (Figs. 1, 6), forming a part of the oil cooling or heat exchange system.

Similarly the low pressure flexible tubes 57 are connected together across the vehicle by the cross tubes 63 at each axle, and the two said tubes 63 are connected together by a longitudinal tube 64. This tube 64 is likewise enclosed in a water-jacket tube 65, forming a part of the oil cooling or heat exchange system. This tube 64 is made larger than the tube 61 and acts as an oil reservoir for the entire system of brakes.

The forward ends of the two water-jackets 62 and 65 are connected by the circulating tube 66; the other ends thereof are connected to a water cooling tank 67 by means of the two pipes 68 and 69, respectively. The low pressure piping system is connected by a pipe 70 to a relief and filling fixture 71, of any suitable design. The two longitudinal tubes 61 and 64 are connected together through the control valve 72 (Figs. 1, 7). In normal brake-free running this valve is wide open and the oil surges freely therethrough continuously from all the above described brake cylinders, and this free circulation is substantially without resistance but, as the valve passage is restricted by the motion downward of the valve, the resistance is increased, resulting in a choking action on the pistons and an increased resistance to their motion, with a resulting increase in the resistance to the motion of the eccentrics and of the wheels.

This valve 72 comprises the conical valve head 73 mounted on the valve stem 74 and seated in the partition 75 between the high pressure valve chamber 76 and the low pressure valve chamber 77. The stem 74 passes upward in the chamber 77 and through suitable packing 78, which is mounted between two plates 79 in the packing cup 80 of the valve housing, and through the cap 81 thereof, which is screwed to the outside of the cup 80.

The lower plate 79 presses down on the spring 82, which engages the low pressure side of the valve head 73. The compressive action of the spring 82 may be adjusted by screwing or unscrewing the cap 81 on the cup 80. In the drawings the cap 81 is shown in its extreme adjusted position but it must be understood that its action on the valve head 73 may be modified by unscrewing the said cap slightly to obtain the desired action of the spring on the valve head 73.

A second spring 83 is mounted in the high pressure chamber 76 between the said valve head 73 and the valve housing.

The cap 81 is provided with a plurality of tapped holes 84 and 85 therein, into which the screws 86 and 87 pass. These screws secure a bracket 88 to the cap. The lower screw 87 passes through to the screw connection between the cup 80 and the cap 81 to lock the cap in adjusted position. The bracket 88 supports the pivot 89 of the bell-crank lever 90.

A head 91 is secured to the top of the valve stem 74 and is engaged by the forked end 92 of the lever 90 to raise and lower the valve 72.

It is, of course, obvious that many means may be adopted to operate the above described mechanism, depending on the circumstances under which the brake is to be operated, for instance, if the brakes on a railroad train equipped with air apparatus in the locomotive, the said air apparatus may either control the said valve mechanism, as above, or air may be used in the place of oil in the brakes, as above described. We have, however, shown the apparatus of an electric system for such control. The rheostat 93 (Fig. 8) is of the common variable resistance type in which the movable element 94 may be operated either by the hand or the foot of the driver. Normally, the rheostat resistance is at its minimum point for brake-free running and the braking action is increased as the resistance is increased and the current diminished. The electric current passes from the rheostat 93 to a solenoid 95 whose armature 96 moves in proportion to the electro-magnetic force against a spring 97. This armature 96 is connected to the long arm of the bell-crank lever 99 to thus control the position of the valve head 73. Thus it will be seen that, when the rheostat member 94 has cut out the resistance thereof, the armature 96 is retracted and the spring 97 compressed to its fullest extent, and the valve 73 is fully opened and all the brakes are released, and as the resistance of the rheostat is increased, the armature moves outward under the action of the spring 97, thus closing the valve in proportion to the movement of the rheostat member 94. If now the connection between the driver's cab and the trailer becomes broken, the current in the solenoid is broken and the spring 97 immediately closes the valve and the brakes are fully applied.

Since the entire braking system is filled with oil, or other suitable fluid, and since each cylinder is independently connected to the manifolds, it is evident that the manifolds receive several hundred impulses a minute when the vehicle is traveling at a normal speed, and in view of the fact that for each such impulse there is an equal and opposite suction, it is evident that the braking action applied to each wheel is substantially steady, and that any throttling action of the free movement of the oil is applied to all the brakes smoothly. Since oil is the only material which has any access to the moving parts, it follows that said moving parts are continuously lubricated and that the wear will be negligible even if the brakes have to be applied for long periods, and that the faster the truck may be moving the greater will be the braking action while, if the truck is standing still on a down grade, the wheels cannot turn so long as the valve is closed, since there can be no movement of the pistons without a free, if restricted, communication between the high and the low pressure sides of the system. And since the oil is continuously cooled and is constantly in motion between the inner free space 34 and the active cylinders 38 and 39, by the passage 59, the whole braking system is kept cool and efficient. Since the pistons and eccentrics operate entirely in free oil and are substantially free of friction, there will be but very slight heat developed in the wheel, with a great benefit to the tires, wheel, bearings and axle, and especially since the oil therein is cooled in the heat exchange. The size of the passages, manifolds, and tubing is, of course, to be adequate to the needs of the system. The motion of the pistons being quite short and relatively slow there will be substantially no vibration present in the brakes.

Though this invention is primarily designed for operating with oil as the fluid medium, it is obvious that t may easily be adapted for use with a compressible medium such as air, the lubrication of the parts being taken care of by separate well known means.

Thus it will be seen that we have invented a means of applying a very powerful braking force equally to all the wheels of a vehicle, and that this force is easily applied and controlled.

It is, of course, to be understood that many changes in the details of our improved brake mechanism and system may be made without departing from the spirit of our invention as outlined in the appended claim.

Having described our invention, what we claim and desire to secure by Letters Patent is:

In a hydraulic brake, the combination of a fixed cylinder block; a rotating brake member surrounded by said fixed block; an eccentrically mounted disk on said rotating brake member; a plurality of radial cylinders formed through said block, the axes of said cylinders lying in the plane of said eccentric disk; closures for the outer ends of said cylinders; pistons in said cylinders and extending therefrom to engage said eccentric disk; closures for the annular space within said block; passages through said pistons and leading to the surface of said eccentric disk; a fluid filling said block, cylinders and passages; and a second passage leading from the space within said block to the outer portion of one said cylinder, whereby said fluid is circulated in said brake.

CLIFTON C. STEVENS.
WALTER F. SANDERS.

REFERENCES CITED

The following references are of record in the file of this patent:

UNITED STATES PATENTS

| Number | Name | Date |
| --- | --- | --- |
| 1,940,925 | Walker | Dec. 26, 1933 |
| 2,035,387 | Heritier | Mar. 24, 1936 |
| 2,065,203 | Aikman | Dec. 22, 1936 |
| 2,154,690 | McFarland | Apr. 18, 1939 |
| 2,225,069 | Marsh | Dec. 17, 1940 |
| 2,232,252 | Mathey | Feb. 18, 1941 |
| 2,428,005 | Bennett | Sept. 30, 1947 |